Figure 1:
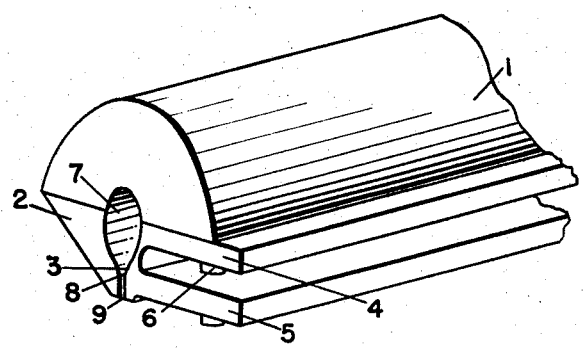

Dec. 23, 1958  R. A. HUDSON  2,865,048
EXTRUSION OF FILM
Filed June 11, 1956

INVENTOR
Ronald Augustus Hudson

BY Cushman, Darby & Cushman
ATTORNEYS

United States Patent Office 2,865,048
Patented Dec. 23, 1958

2,865,048

EXTRUSION OF FILM

Ronald Augustus Hudson, Welwyn Garden City, England, assignor to Imperial Chemical Industries Limited, London, England, a corporation of Great Britain Application June 11, 1956, Serial No. 590,635

Claims priority, application Great Britain July 6, 1955

1 Claim. (Cl. 18—12)

This invention relates to a process and apparatus for extruding organic thermoplastic materials in the form of flat film having beaded or thickened edges.

The provision of beaded edges on flat film that is to be oriented by stretching has been found to be advantageous as such edges reduce or substantially eliminate uneven width reduction which is otherwise likely to occur when the film is longitudinally stretched; and to ensure uniformity of width reduction it is desirable that the beaded portion of each edge be of substantially uniform width and thickness. It has also been found that for a range of thicknesses at the centre of the film there is a preferred constant ratio of edge thickness to centre thickness for which optimum results are obtained on longitudinally stretching the film, with a minimum wastage of material in the edge beads.

It is an object of the present invention to provide a process and apparatus by means of which may be produced, by melt extrusion of an organic thermoplastic material, a flat film having edge beadings of substantially constant width and thickness. It is a further object to provide film extrusion apparatus that is capable of being readily adjusted to give film of various centre thicknesses but having a constant ratio of edge thickness to centre thickness.

In dies used for the melt extrusion of flat film of even thickness and good surface quality the lips of the film forming die are so designed that, when they are in position, their internal surfaces converge to the desired width of the extrusion orifice and then remain parallel to each other over a certain distance terminating at the extrusion orifice; and we have found that the amount of melt extruded through an orifice of given width, under constant conditions of temperature and pressure of the melt, is directly proportional to the length of this parallel section of the die lips. Thus, we have found that by reducing this distance over small sections at each end of the film forming die the amount of material extruded at each end is increased, a uniform beading is formed at each edge of the extruded film, and, under uniform conditions of extrusion temperature and pressure, the ratio of the thickness of this beading to the thickness at the centre of the film remains constant with alteration in the overall width of the die orifice.

Accordingly, the present invention comprises a process for the production of flat film having beaded edges in which an organic thermoplastic material in the molten state is extruded through the slot orifice of a film-forming die that includes a centre portion in which the internal surfaces of the opposed die lips are parallel to each other over a certain length terminating at the extrusion orifice, and an end portion at each side of said centre portion in which the internal surfaces of the opposed lips are parallel to each other over a length terminating at said extrusion orifice that is less than said certain length in the centre portion of the die, the parallel-walled extrusion channel formed between said lip surfaces being preceded in the centre and end portions by a channel of greater width through which the molten material is supplied.

Our invention also comprises apparatus for the extrusion of organic thermoplastic material in the molten state in the form of flat film having beaded edges, that includes a die having a slot orifice and having a centre portion in which the internal surfaces of the opposed die lips are parallel to each other over a certain length terminating at the extrusion orifice, and an end portion at each side of said centre portion in which the internal surfaces of the opposed lips are parallel to each other over a length terminating at said extrusion orifice that is less than said certain length in the centre portion of the die, the parallel-walled extrusion channel formed between said lip surfaces being preceded in the centre and end portions by a channel of greater width through which the molten material may be supplied.

Figure 2:
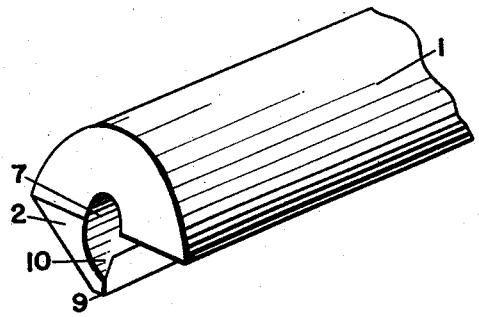

One particular form of apparatus constructed in accordance with the present invention is shown diagrammatically in the accompanying drawings, in which:

Figure 1 is a perspective view of the end portion of a suitable die, with end plate removed; and Figure 2 is the same view with one lip removed from the die.

In these figures 1 represents the body portion of the die to which are bolted the lips 2 and 3. The lip 3 is substantially U-shaped in section, the upper limb being bolted immovably to the body portion of the die, and the lower limb being slightly flexible and capable of being moved towards or away from the upper limb by means of a series of bushes 6, spaced across the whole width of the die; in this way the width of the slit orifice may be adjusted to give film of uniform thickness across the whole central region. The body portion of the die forms with the lips a passageway 7, for the molten material, and the lips form a parallel-walled extrusion channel terminating at a slot orifice 9. The length of the parallel portion of the lip surfaces is decreased at each end of the die by grinding one or both of the lip surfaces in the manner shown at 10. The amount of material to be removed is determined by experimental extrusion at intervals during grinding until the desired ratio of bead to centre thickness is obtained in the film. The two ends of the die are closed by end plates (not shown) one of which is provided with an inlet for supplying the molten polymer to the passageway 7.

In operation, the molten polymeric material is fed to the die and extruded through the slit orifice to form a film having a bead along each edge. The width of the orifice is adjusted locally to give film of the desired uniform thickness across its whole width except at the beaded edges, and the beads are found to be of uniform width and thickness, and restricted to the edge portions of the film. The film is usually edge-trimmed after drawing and heat setting, and flat film of uniform thickness across its whole width is obtained.

An advantage of the apparatus of the present invention is that once the desired ratio of centre to edge thickness in the extruded film has been obtained, this ratio remains substantially constant with adjustment of the overall width of the slot orifice, and hence with variations in the overall thickness of the extruded film.

The process of the present invention is particularly adapted to the production of film from polyethylene terephthalate. It may however be used with advantage in the production from organic thermoplastic material of any flat film that is to be stretched after it has cooled from the molten state, including, for example, film formed from: polyethylene terephthalate; polythene; polyamides such as polyhexamethylene adipamide, polyhexamethylene sebacamide and polycaproamide; polyvinylidene chloride; rubber hydrochloride; or polystyrene.

I claim:

Apparatus for the extrusion of organic thermoplastic material in the molten state in the form of flat film having beaded edges, comprising a die body member and opposed lip members defining a slot orifice therebetween and terminating in an extrusion orifice, the facing slot-defining surfaces of said lip members being parallel and extending from said extrusion orifice inwardly to divergent wall sections, the width of said parallel slot-defining surfaces being uniform throughout the central portions thereof and reduced at the ends thereof by approach of said divergent wall sections more closely to said extrusion orifice.

References Cited in the file of this patent

UNITED STATES PATENTS

| | | |
|---|---|---|
| 2,387,718 | Coleman | Oct. 30, 1945 |
| 2,560,022 | Formaz | July 10, 1951 |
| 2,686,931 | Knox | Aug. 24, 1954 |
| 2,765,492 | Velvel | Oct. 9, 1956 |